United States Patent

Sun et al.

(10) Patent No.: US 8,212,448 B2
(45) Date of Patent: Jul. 3, 2012

(54) ELECTRIC MOTOR

(75) Inventors: Yao Qi Sun, Shenzhen (CN); Yong Li, Shenzhen (CN); Li Ping Gui, Shenzhen (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 0 days.

(21) Appl. No.: 12/613,939

(22) Filed: Nov. 6, 2009

(65) Prior Publication Data

US 2010/0117478 A1 May 13, 2010

(30) Foreign Application Priority Data

Nov. 7, 2008 (CN) .......................... 2008 1 0217288

(51) Int. Cl.
*H02K 23/64* (2006.01)
*H02K 1/14* (2006.01)
*H02K 15/02* (2006.01)

(52) U.S. Cl. ........... 310/158; 310/216.008; 310/216.009

(58) Field of Classification Search .................. 310/158, 310/216.08, 216.009, 216.015, 216.055, 310/216.079, 216.086
See application file for complete search history.

(56) References Cited

U.S. PATENT DOCUMENTS

| | | | |
|---|---|---|---|
| 4,675,566 A | 6/1987 | Nystuen et al. | |
| 4,707,910 A * | 11/1987 | Saeed | 29/596 |
| 6,198,195 B1 * | 3/2001 | Embree et al. | 310/254.1 |
| 6,300,702 B1 * | 10/2001 | Jack et al. | 310/216.066 |
| 7,078,843 B2 * | 7/2006 | Du et al. | 310/216.091 |
| 7,081,698 B1 * | 7/2006 | Burkholder et al. | 310/261.1 |
| 7,205,696 B2 * | 4/2007 | Du et al. | 310/216.091 |
| 7,545,070 B2 * | 6/2009 | Schach et al. | 310/184 |
| 7,546,672 B2 * | 6/2009 | Murase | 29/596 |
| 2002/0047446 A1 * | 4/2002 | Meyer | 310/180 |

FOREIGN PATENT DOCUMENTS

| | | |
|---|---|---|
| GB | 609936 | 3/1946 |
| GB | 2266413 A | 10/1993 |
| JP | 10174319 A * | 6/1998 |

* cited by examiner

*Primary Examiner* — Tran Nguyen

(74) *Attorney, Agent, or Firm* — Muncy, Geissler, Olds & Lowe, PLLC

(57) ABSTRACT

A universal motor has a stator and a rotor installed in the stator. The stator comprises a pair of stator segments. Each segment has a yoke with first and second ends, a pole and a neck connecting the pole to the first end of the yoke. The second end of each yoke is connected with the first end of the other yoke. A pair of pre-formed windings are mounted on respective poles of the stator segments.

12 Claims, 3 Drawing Sheets

ELECTRIC MOTOR

CROSS REFERENCE TO RELATED APPLICATIONS

This non-provisional patent application claims priority under 35 U.S.C. §119(a) from Patent Application No. 20810217288.2 filed in The People's Republic of China on Nov. 7, 2008.

FIELD OF THE INVENTION

This invention relates to an electric motor and in particular, to a stator for a universal motor.

BACKGROUND OF THE INVENTION

As shown in FIG. 4, a typical stator of a universal motor consists of a plurality of single piece laminations stacked together. The stator comprises a yoke 14 and a pair of opposing poles 16 extending from an inner surface 15 of the yoke 14 via a neck 18. Receiving spaces 20 are formed between the poles 16 and the yoke 14. Windings 22 are wound around the poles 16 in the receiving spaces to locate about the neck. However, the winding is loosely wound as the force applied to the wires during winding is not sufficient to produce a tight winding in order to avoid breaking of the wires. The loose winding cannot be arranged to extend outside of the receiving space as it is easy for turns of the winding to fall into the gap between the pole and the rotor causing failure of the motor. Thus, the winding is limited by the length of the poles 16.

One known option to overcome the above problem is pre-forming the winding 22 and then mounting the pre-formed winding to the poles 16 of the stator core. However, the opening of the winding 22 should be greater than the width of the poles such that the poles are capable of extending through the opening of the winding 22 without deformation to allow the winding to be mounted to the poles. Thus, the winding 22 is not fixed relative to the stator core after assembly. Another known option, as shown in U.S. Pat. No. 7,546,672, is to pre-form the winding 22 with an opening equal to the width of the neck. During mounting of the windings to the stator core, the poles 16 are squeezed. After the windings are mounted to the stator core, the poles 16 are deformed to return to their original shape whereby the poles retain the windings 22 in the receiving spaces. However, the poles are deformed twice and the process is therefore complicated.

SUMMARY OF THE INVENTION

Hence there is a desire for a universal motor with an improved stator.

This is achieved in the present invention by using a stator core having two stator segments.

Accordingly, in one aspect thereof, the present invention provides a universal motor comprising a stator and a rotor installed in the stator, the stator comprising: a pair of identical stator segments, each segment comprising a yoke having first and second ends, a pole and a neck connecting the pole to the first end of the yoke, the second end of each yoke being connected with the first end of the other yoke, and a pair of pre-formed windings mounted on respective poles of the stator segments.

Preferably, each winding is received in a receiving space defined by the respective pole, associated neck and adjacent portions of the two yokes.

Preferably, parts of the windings extend beyond the respective receiving spaces.

Preferably, a complementary locking structure is formed at each interface between adjacent ends of the yokes.

Preferably, the complementary locking structure comprises a groove formed in one end of each yoke, and a projecting rib formed on the other end of each yoke and engaged in the groove of the other yoke.

Preferably, the interface is located at the closed end of a respective receiving space and inclined relative to the circumferential direction of the stator.

According to a second aspect, the present invention provides a method of making a stator for a universal motor, comprising: providing two stator segments, each having a yoke having first and second ends, a neck formed at the first end of the yoke, and a pole extending from the neck, with a receiving space being formed between the poles, the neck and the first end of the yoke; mounting a pre-formed winding to the pole of the stator segment with a part of the winding being retained in the receiving space; and joining the two stator segments together by connecting the first end of each yoke to the second end of the other yoke with a portion of the respective pre-formed winding disposed between the pole of one segment and the second end portion of the other yoke.

Preferably, the step of joining the two segments together includes forming a groove on one end of each yoke and forming a rib on the other end of each yoke and pressing the rib of each yoke into the groove of the other yoke.

Preferably, the method includes forming each interface between adjacent ends of the yokes to extend from the neck of the corresponding pole to an outer edge of the stator in a direction inclined relative to the circumferential direction of the stator.

Preferably, the method includes forming the interfaces to extend to a location on the outer edge of the stator circumferentially spaced closer to the radial plane passing through the centre of the adjacent pole.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
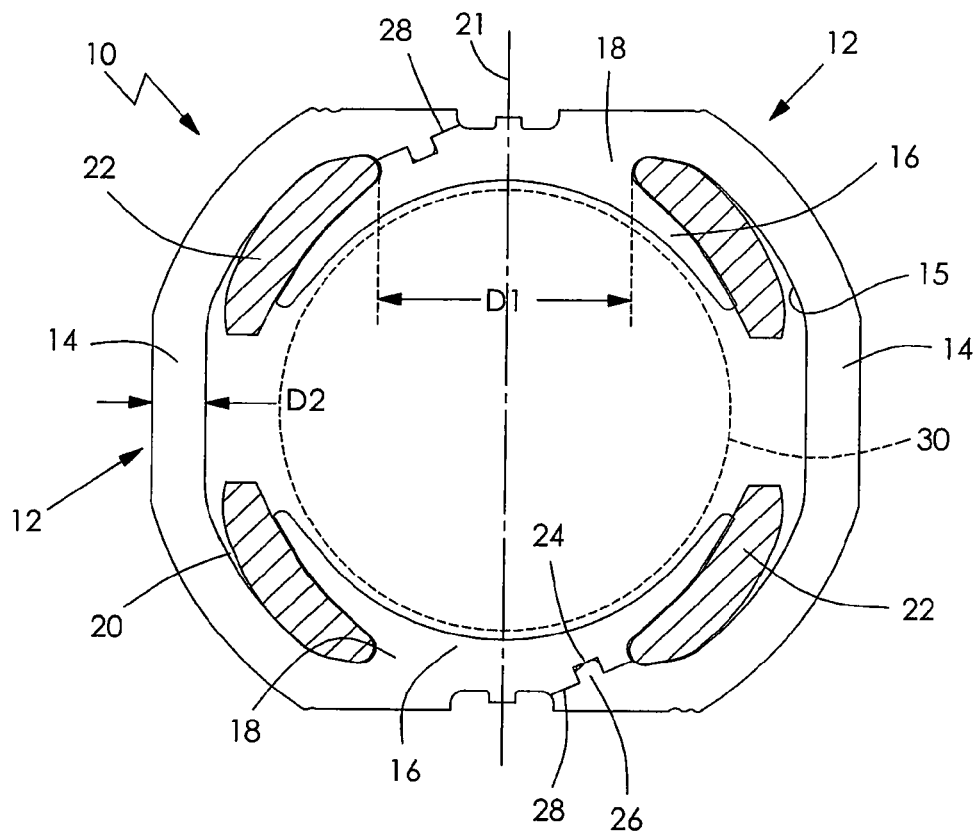
FIG. 1 is a cross sectional view of a stator of a universal motor in accordance with a preferred embodiment of the present invention.
Figure 2:
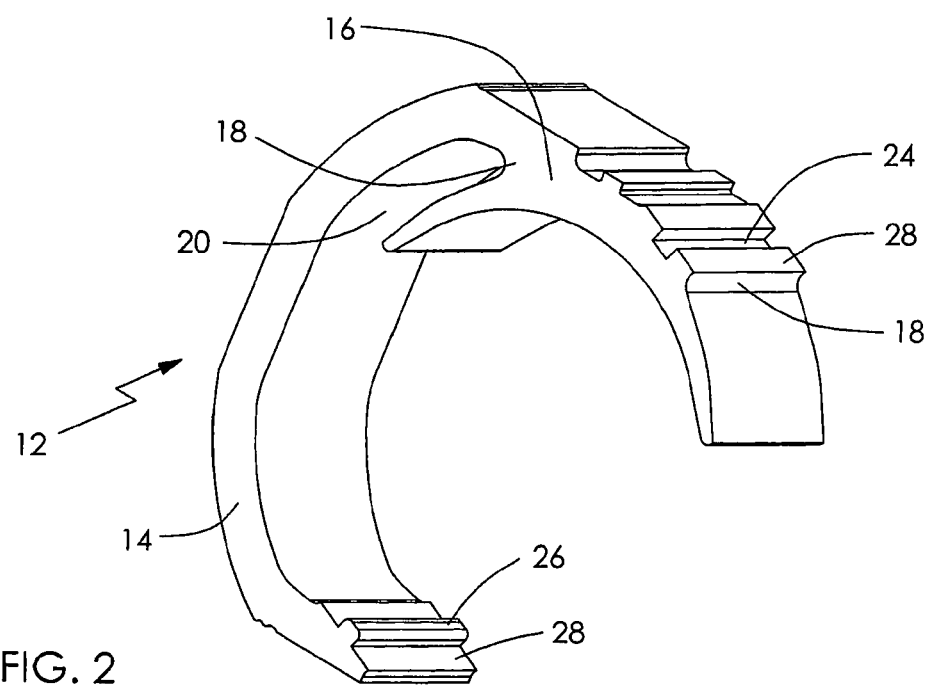
FIG. 2 is an isometric view of a stator segment of the stator of FIG. 1.

FIGS. 1 & 2 illustrate a stator for a universal motor in accordance with a preferred embodiment of the present invention. The universal motor comprises a stator 10 and a rotor 30 installed in the stator 10. The stator 10 comprises two identical stator segments 12 connected together via two interfaces there between. Each segment 12 comprises a yoke 14, a neck 18 formed at one end of the yoke 14, and a poles 16 extending from the neck 18. The pole 16 has a pole surface. The pole surfaces of both poles 16 are located on or partially form a circle surrounding the rotor. A receiving space 20 is formed between adjacent ends of the yokes 14 of the segments 12, the neck 18 and the pole 16 of one segment 12. A pre-formed winding 22 is received in each receiving space 20, surrounding the corresponding neck 18 and the poles 16. A part of the winding 22 is able to extend out of the space 20 since the winding 22 is pre-formed. Thus, the size of the winding may be increased (eg by increasing the number of turns or the wire diameter) without increasing the size of the poles or increasing the overall dimensions of the stator. This allows the efficiency of the motor to be increased compared with the prior art.

A locking structure is formed at each interface 28 or joint between the segments 12. The locking structure comprises a groove 24 formed in one of each yoke 14 and a rib 26 formed at the other end of each yoke and engaged in the groove 24. Preferably, the width D1 of the neck 18 is not less than twice of the width D2 of the yoke 14 such that the flux from the two yokes 14 may pass through the neck 18 without being restricted or saturated. Preferably, the interface 28 forms the end of the yokes and extends between the neck 18 and a point on the outer surface of the stator and is inclined relative to the circumferential direction of the stator. Preferably, it is inclined towards an axial plane 21 passing through the centre of the corresponding pole. The interface is located at a place where the magnetic flux density is relatively low compared to other places, to thereby decrease the influence of the interface on the flux.

Figure 3A:
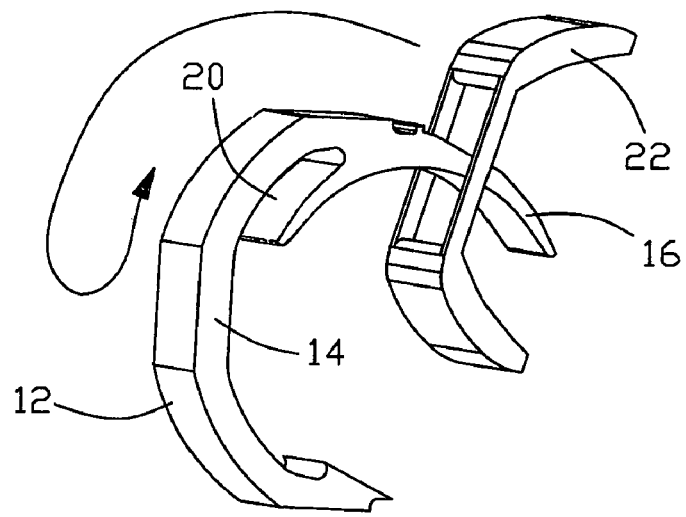
FIGS. 3A to 3C show two processes for mounting a stator winding to the stator segment of FIG. 2.
Figure 3B:
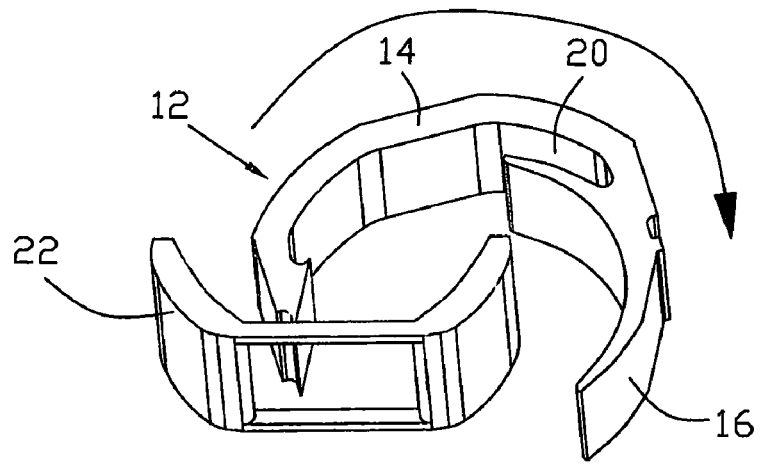
Figure 3C:
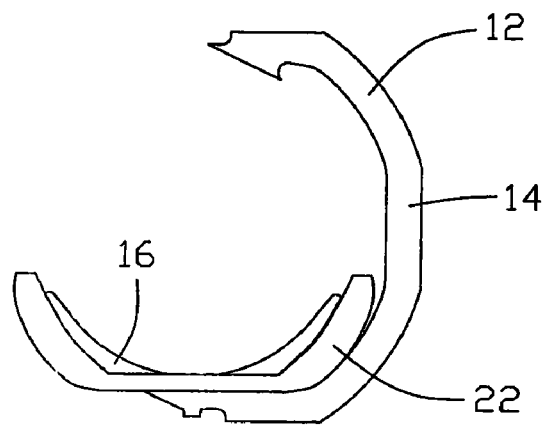
Figure 4:
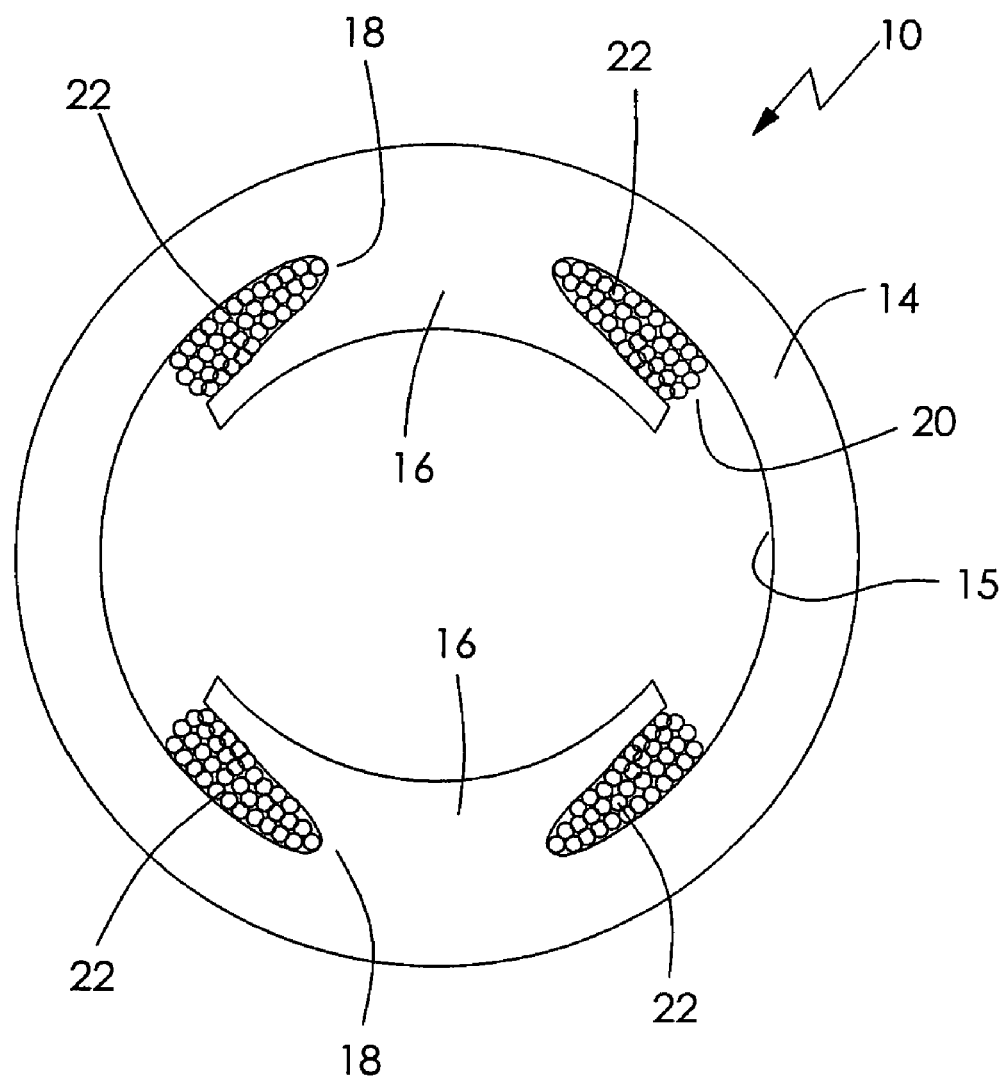
FIG. 4 is a cross sectional view of a conventional stator of a universal motor.

FIGS. 3A to 3C, illustrate two methods of assemblying the preformed windings 22 to the segments 12. The windings 22 are pre-formed according to the size and shape of the necks 34 and poles 16 of the segments 12. In the method of FIG. 3a, one end of a pole 16 is inserted through the opening of the winding 22 and the winding 22 is slipped into the receiving space 20 and about the neck 18 and pole 16 in the direction indicated by the arrow to resemble the arrangement shown in FIG. 3c. In the method of FIG. 3b, the free end of the yoke 14 is inserted through the opening of the winding 22 and the winding 22 is slipped into the receiving space 20 and about the neck 18 and pole 16 in the direction indicated by the arrow to resemble the arrangement shown in FIG. 3c. Thus the winding 22 surrounds the neck 18 of the segment 12 and a half thereof is retained in the receiving space 20 formed between the yoke 14, neck 18 and one corresponding pole 16.

Finally, the two segments 12, each with a winding 22 mounted thereon are connected to each other via the locking structures formed at the interfaces there between. The two segments 3 may be joined together by pressing the ribs into the grooves and/or by welding the segments together at the interface 28 using the grooves and ribs to align the segments. The free side of the winding 22 which lies against the pole 16 is held in place by the other yoke when the two segments are brought together.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A universal motor comprising a stator and a rotor installed in the stator, the stator comprising:
a pair of identical stator segments, each segment comprising a yoke having first and second ends, a pole and a neck connecting the pole to the first end of the yoke, each pole having two opposite ends in a circumferential direction of the rotor, the first end of the yoke having a first planar end surface, the second end having a second planar end surface which is oppositely arranged relative to the first planar end surface, the first and second planar end surfaces being inclined relative to an axial plane passing through a center of the pole, one of the first and second planar end surfaces having a groove and the other one having a projecting rib, the projecting rib on each yoke being engaged in the groove of the other yoke, and the first planar end surface of each yoke being in contiguous contact with the second planar end surface of the other yoke; and
a pair of pre-formed windings mounted on respective poles of the stator segments.

2. The motor of claim 1, wherein the groove and the projecting rib of each yoke are oppositely arranged relative to each other.

3. The motor of claim 1, wherein the groove and the projecting rib of each yoke are inclined towards the axial plane passing through the center of the pole.

4. The motor of claim 1, wherein the first planar end surface of each yoke extends from a point at the respective pole to a point at an outer surface of the yoke and has a length in the extending direction greater than the greatest radial width of the yoke so that the magnetic flux density at the first planar end surface is smaller than other places of the yoke.

5. The motor of claim 1, wherein each of the two opposite ends of each pole has a straight edge in the axial direction of the motor.

6. The motor of claim 1, wherein each winding is received in a receiving space defined by the respective pole, associated neck and adjacent portions of the two yokes.

7. The motor of claim 6, wherein parts of the windings extend beyond the respective receiving spaces.

8. The motor of claim 6, wherein the first planar end surface is located at a closed end of a respective receiving space and inclined relative to the circumferential direction of the stator.

9. The motor of claim 1, wherein the two stator segments are welded together.

10. The motor of claim 1, wherein the projecting rib on each yoke is pressed into the groove of the other yoke.

11. A universal motor comprising a stator and a rotor installed in the stator, the stator comprising:
a pair of identical stator segments, each segment comprising a yoke having first and second ends, a pole and a neck connecting the pole to the first end of the yoke, each pole having two opposite ends in a circumferential direction of the rotor and a pole surface confronting the rotor, the first end of the yoke having a first planar end surface formed at an outer surface thereof which is opposite to the pole surface, the second end having a second planar end surface formed at an inner surface thereof, the first and second planar end surfaces being inclined relative to an axial plane passing through a center of the pole, one of the first and second planar end surfaces having a groove and the other having a projecting rib, the projecting rib on each yoke being engaged in the groove of the other yoke, and the first planar end surface of each yoke being in continuous contact with the second planar end surface of the other yoke; and
a pair of pre-formed windings mounted on respective poles of the stator segments.

12. The motor of claim 11, wherein the projecting rib extends from the first or second planar end surface in a direction which is inclined relative to the circumferential direction of the stator.

* * * * *